…

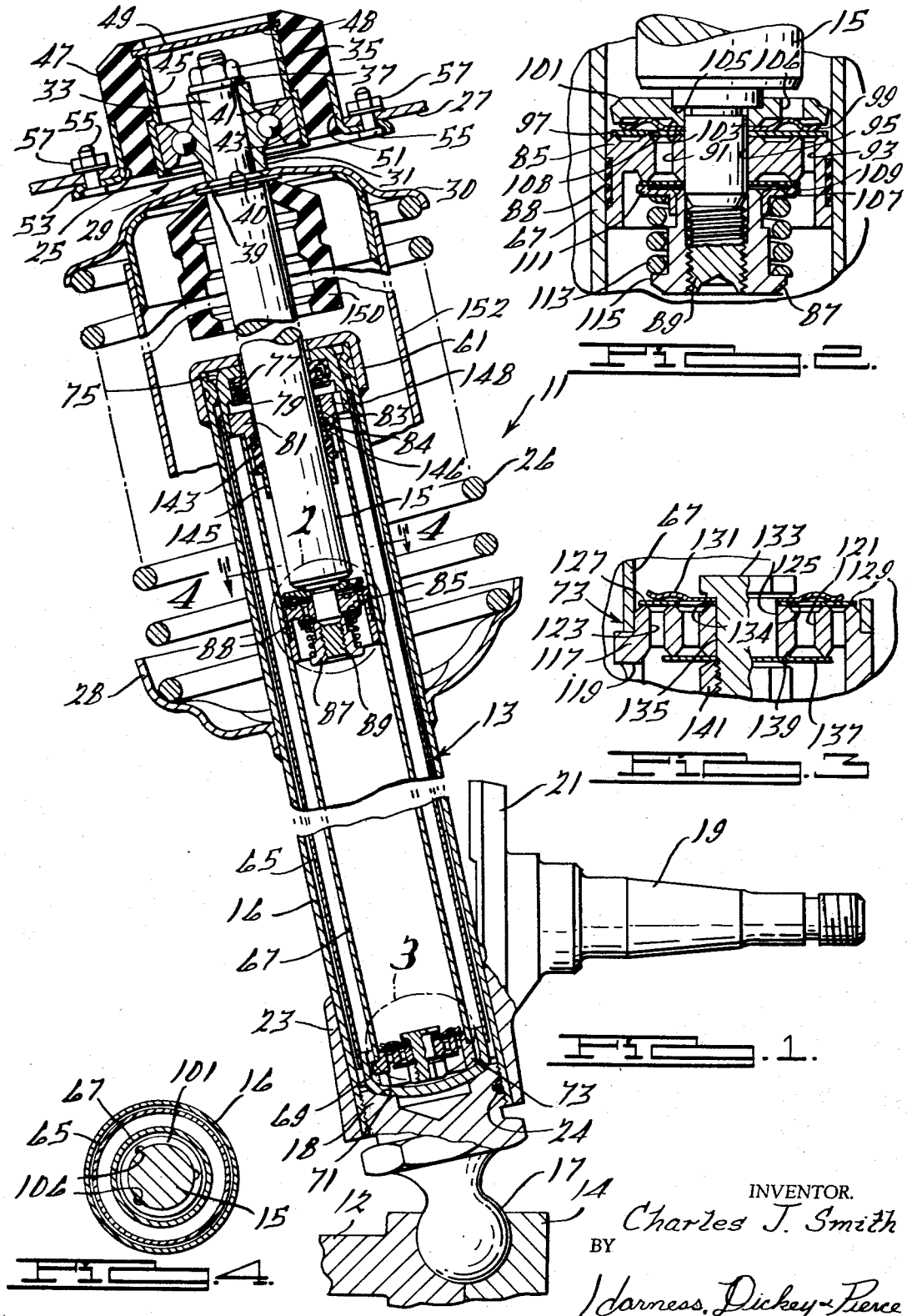

United States Patent Office 3,346,272
Patented Oct. 10, 1967

3,346,272
VEHICLE SUSPENSION DEVICE
Charles J. Smith, Monroe, Mich., assignor to Monroe Auto Equipment Company, Monroe, Mich., a corporation of Michigan
Filed Oct. 14, 1965, Ser. No. 496,045
7 Claims. (Cl. 280—96.2)

ABSTRACT OF THE DISCLOSURE

A vehicle coil spring and shock absorber connected directly to the front wheel by a mounting tube having a removable bottom through which the shock absorber may be removed.

---

This invention relates generally to motor vehicles, and particularly to an improved suspension device flexibly supporting the vehicle chassis upon ground contacting wheels.

In some motor vehicle suspension systems, it is desirable to locate the suspension devices which together make up the front suspension system and which devices each include a coil spring and shock absorber, directly at each vehicle front wheel. One such suspension system is illustrated and described in the U.S. Patent No. 2,624,592 to MacPherson and is referred to in the trade as the MacPherson system.

One of the undesirable aspects of this type of suspension system, has been that in the past it has been necessary to dismantle a major portion of the vehicle front end, including each wheel and wheel spindle when removing and replacing the shock asborbers after their parts become worn. This is a costly, difficult and time consuming process and requires special tools and skills. Therefore, a suspension device incorporating the desirable features of the MacPherson system but which eliminates the complex dismantling and replacement aspects for the shock absorber would be highly desirable.

Main objects of the present invention are an improved vehicle suspension device including a coil spring and shock absorber which supports the vehicle chassis directly at each wheel and which permits the shock absorber to be removed and replaced in installation with a minimum of difficulty and without disturbing or dismantling other vehicle components.

Further objects include an improved suspension device of the above character which is relatively inexpensive to manufacture, rugged in construction and reliable in use.

Other objects and advantages of the present invention will become more apparent from a consideration of the following detailed description taken in conjunction with the drawings in which:

FIGURE 1 is a sectional view of a suspension device embodying the present invention;

FIGURE 2 is an enlarged view of a portion of the structure of FIGURE 1 taken within the circle 2;

FIGURE 3 is an enlarged view of a portion of the structure of FIGURE 1 taken within the enclosure 3; and FIGURE 4 is a sectional view of FIGURE 1 taken along the line 4—4 thereof.

Broadly described, the present invention includes an automotive vehicle suspension device having a telescopic type, shock absorber and a surrounding coil spring wherein the shock absorber has one end detachably connectable to the vehicle body or frame and the other end removably supported within a tube connectable to the vehicle wheel spindle so that the shock absorber is removable upon detaching from the vehicle body or frame without disturbing the wheel or wheel spindle.

Referring now more specifically to the drawings and particularly FIGURE 1, a suspension device embodying the present invention is illustrated generally at 11 and is seen to include a cylinder assembly 13 comprising a plurality of concentric tubes in which a piston rod 15 is slidably disposed in telescopic fashion, the cylinder assembly 13 and piston rod together forming a vehicle shock absorber. The cylinder assembly 13 is removably supported in a tube 16 secured at its lower end to a wishbone suspension member 12 through a ball 17 universally received in a detachable socket 14, the ball 17 having an integral threaded upper end 18 threadedly received in the tube 16. A wheel spindle 19 upon which the vehicle wheel (not shown) is mounted has a sleeve 23 encompassing and secured to the lower end of the tube 16. A removable locking pin 24 extends through aligned openings in the tube 16, the threaded end 18 and the sleeve 23 to prevent the ball 17 from inadvertently detaching from the tube 16 during use.

The piston rod 15 extends upwardly through an opening 25 in the body or frame of the vehicle, a portion of which is shown at 27. A ball bearing 29 has an elongated inner race 31 held on a reduced end 33 of the piston rod 15 by a nut 35 and washer 37. The lower end of the bearing inner race 31 engages a washer 39 seated against a shoulder 40 on the piston rod 15. The outer race 41 of the bearing 29 is seated in an enlarged end 43 of a tubular member 45 secured in sleeve 47 which may be constructed of flexible rubber or rubber-like material. The enlarged end 43 of the tubular member 45 is crimped below the outer bearing race 41 to hold the bearing 29 in place. A disc 49 is removably positioned in a groove 48 in the upper end of the sleeve 47 to keep dirt, grease and other foreign matter from accumulating above and contaminating the bearing 29. The sleeve 47 is secured to the vehicle body 27 by an annular collar 51 surrounding and secured to the sleeve 47 and formed with an integral radially outwardly extending flange 53 overlying the vehicle body 27 and secured thereto by bolts 55 and nuts 57.

In use, the shock absorber piston rod 15 moves with the vehicle body or frame 27 and slides telescopically within the cylinder assembly 13, the flexible sleeve 47 allowing angular displacement between the piston rod 15 and the body or frame 27 and the ball bearing 29 allowing the piston rod to turn therewithin. The tube 16 which houses the cylinder assembly 13 is supported upon the wishbone suspension number 12 through the ball 17 and turns with the wheel (not shown) and the spindle 19 substantially about the longitudinal central axis of the tube 16 and cylinder assembly 13.

The vehicle chassis weight is supported by the wheels and is suspended at each wheel by a coil spring 26 sleeved over the tube 16. The lower end of the spring 26 is seated in an annular spring support 28 welded or otherwise secured to the tube 16 and the spring upper end is seated in a hat-shaped annular support 30 seated between the bearing inner race 31 and the washer 39. Thus, when the vehicle body or frame 27 moves downwardly relative to the wheels (not shown), the piston rod 15 moves downwardly within the cylinder assembly 13 and the spring 26 is compressed. Upward movement of the vehicle body or frame 27, of course, causes upward movement of the piston rod 15 and allows the spring 26 to expand.

To cushion and dampen this relative movement between the vehicle body and frame 27 and the wheels and creating the desired shock-absorbing characteristics, the piston rod 15 and cylinder assembly 13 are provided with valve means shown in FIGURE 1 and in greater detail in FIGURES 2 and 3. Thus, the cylinder assembly 13 includes an outer or reserve tube 65 having its lower end closed by a cap or closure 69 which is seated in a recess 71 in the threaded end 18 of the ball 17. A pressure cylinder 67 is positioned within the reserve tube 65 and has a valve assembly 73 fitted in and closing the lower end thereof, the valve assembly 73 being seated in the cap 69.

The upper end of hte reserve tube 65 has a cap 75 fitted therein and seated against a cap 61 welded to the tube 16. A seal assembly 77 is held in the cap 75 by a retaining ring 79 and engages the piston rod 15 to prevent the loss of fluid pressure therepast. The lower end of the cap 75 positions an annular piston rod guide 81 which surrounds and guides the piston rod 15 and has its lower end fitted in the upper end of the pressure tube 67. An absorbent and resilient annular sleeve 83 held in the rod guide 81 by a snap ring 84 engages the piston rod 15 and prevents it from becoming scored during movement relative to the guide 81.

A piston 85 is retained on a reduced and threaded lower end 89 of the piston rod 15 by a nut 87 and has a piston ring 88 engaging the wall of the pressure cylinder 67 to prevent the flow of fluid therepast. The piston 85 is provided with an inner set of circumferentially spaced passages 91 and an outer set of circumferentially spaced passages 93 and has a central aperture 95 through which the reduced and threaded lower end 89 of the piston rod 15 extends (FIGURE 2). The upper ends of the passages 93 are closed by a disc 97 yieldably held in engagement with a valve seat 98 on the top of the piston 85 by a finger-type spring 99. A support washer 101 has an annular flange 103 engaging and holding the inner peripheral portion of the spring 99 against the piston 85. The washer 101, in turn, is disposed between the top of the piston 85 and a radial shoulder 105 on the piston rod 15. The washer 101 also has one or more apertures 106 which communicate with apertures 108 in the disc 97 and with the upper ends of the inner passages 91. The lower ends of the inner passages 91 are closed by a valve disc 107 yieldably held in engagement with a valve seat 109 on the lower surface of the piston 85 by a cage 111 against which one end of a compression spring 113 acts, the other end of the compression spring engaging a flange 115 on the nut 87.

The valve assembly 73 at the lower end of the pressure tube 67 is shown in greater detail in FIGURE 3 and includes a valve body 117 having grooves 119 in its underside which communicate the space beneath the valve body 117 with the space between the pressure cylinder 67 and the reserve tube 65, so that hydraulic fluid can flow from the pressure cylinder to the reserve tube and vice versa. The valve body 117 has an inner set of circumferentially spaced passages 121 and an outer set of circumferentially spaced passages 123 and a large central aperture 125. The upper ends of the passages 123 are closed by a valve disc 127 yieldably held in engagement with a valve seat 129 on the top surface of the valve body 117 by a finger-type spring 131. The inner circumference of the spring 131 and the valve disc 127 are held against the valve seat 129 by a head 133 formed on a nut or plug 135 extending through the aperture 125. The valve disc 127 has one or more apertures 134 which communicate with the upper ends of the aperture 121. The lower ends of the apertures 121 are closed by a valve disc 137, the inner circumferential portion of which is held in engagement with a valve seat 139 on the lower surface of the valve body 117 by a nut 141 threaded on the lower end of the plug 135.

In use, the vehicle body weight is supported by the wheels and is suspended at each wheel by the coil spring 26 as described above. When the vehicle body moves upwardly relative to the wheel causing the piston 85 to move upwardly relative to the cylinder assembly 13 on the rebound stroke, the pressure of the hydraulic fluid in the pressure cylinder 67 above the piston increases until the valve disc 107 moves away from the valve seat 109 and the fluid flows through the inner piston passages 91 into the lower portion of the pressure cylinder 67. The fluid pressure at which the valve disc 107 moves away from the seat 109 is a function of the stiffness of the spring 113 and that of the disc 107. Because the piston rod 15 occupies a portion of the pressure cylinder 67 above the piston 85, it is necessary that the lower portion of the pressure cylinder be replenished with fluid during the rebound stroke. This is achieved by the flow of liquid from the reserve tube 65 through the apertures 119 in the valve body 117 and upwardly through the outer passages 123. As the valve plate 127 is held on its seat only by the light spring 131, the differential pressure on opposite sides of the valve plate 127 is sufficient to move the valve plate away from its seat 129 so that the pressure cylinder remains filled with fluid. Upward movement of the piston rod 15 is limited and cushioned by a resilient annular sleeve 143 engageable with the lower end of the guide 81 and held in place on the piston rod 15 by a collar 145. The sleeve 143 has one or more radial slots 146 at its upper end and the sleeve 143 and collar 145 are spaced from the wall of the pressure cylinder 67 permitting fluid within the pressure cylinder to maintain the absorbent sleeve 83 saturated.

When the piston 85 moves downwardly in the pressure cylinder 67 on the compression stroke, fluid in the pressure cylinder below the piston flows upwardly through the outer piston passages 93 when sufficient pressure has been built up below the piston 85 to overcome the force of the spring 99 and move the valve disc 97 away from of its seat 108. The pressure cylinder 67 above the piston 85 cannot accommodate all of the fluid displaced from the lower portion of the pressure cylinder because of the presence of the piston rod 15. Therefore, as the piston 85 moves downwardly in the pressure cylinder 67, fluid pressure builds up below the piston 85 and moves the valve disc 137 away from the valve seat 139 by flexing the disc thereby allowing fluid to flow from the lower portion of the pressure cylinder 67 through the apertures 119 in the valve body 117 and out to the reserve cylinder 65. One or more passageways 148 in the piston rod guide 81 permit fluid in the reserve cylinder 65 to maintain the top of the absorbent sleeve 83 saturated. Downward travel of the piston rod 15 is cushioned and limited by a resilient sleeve 150 fixed to the piston rod 15 and engageable with the top of the cap 61. A skirt 152 is seated against the spring support 30 and surrounds the sleeve 150 and the top of the tube 16 to prevent dirt, grease and other foreign matter from getting on the piston rod 15.

The resistance of the suspension device to compression and rebound movement is established by the size of the passageways and the stiffness of the valve discs and the loading springs so as to attain the desired operating conditions and provide smooth and comfortable riding qualities.

As described above, a major problem which has existed in suspension systems of this type has been that when the shock absorber components become worn and require replacement, a major portion the vehicle front end and steering controls had to be dismantled. This was so because in these prior systems, the cylinder assembly 13 was connected directly to the spindle 19 and to the ball 17 of the ball socket joint. This problem has been eliminated by the present invention by providing the tube 16 which here is secured to the spindle 19 and to the ball 17 as illustrated and described making the entire shock-absorber assembly easily removable. Thus, when the shock-absorber components, including the piston 85, the pressure cylinder 67 and the valves become worn and require replacing, it is only necessary to remove the nut 35 from the upper reduced end 33 of the piston rod 15 after snapping the plate 49 out of the sleeve 47 and to unscrew the ball member 17 from within the tube 16 after removing the pin 24. The entire shock-absorber assembly including the reserve tube 65, the pressure tube 67 and the piston rod 15 can then be slid out of the tube 16 through its lower end. During this time, the bearing 29 and the washer 39 hold the spring support 30 in place so that the spring 26 remains intact. Thereafter, a new shock-absorber assembly is inserted, the ball member 17 threaded into the lower end of the tube 16 and the nut 35 threaded on the upper reduced end 33 of the new piston rod 15. In this way, the old shock absorber is quickly and easily removed and replaced with a new one without requiring costly, difficult and time-consuming dismantling of the vehicle front end or steering controls.

Thus, by the present invention there has been provided an improved suspension device having an easily replaceable shock-absorber assembly constructed to fulfill the objects hereinabove set forth, and while a preferred embodiment has been illustrated and described above in detail, various additions, substitutions, modifications and omissions may be made thereto without departing from the spirit of the invention as encompassed by the appended claims.

What is claimed is:

1. In an independent wheel suspension device for an automotive vehicle, said suspension device comprising a hydraulic tubular shock absorber having a pair of relatively movable telescopic parts, detachable means on one of said telescopic parts connectable to a body portion of said vehicle, a tube removably supporting the other of said telescopic parts, said tube being connectable to a wheel spindle and having a removable end portion whereby said shock absorber is removable and replaceable through the end of said tube having said removable end portion upon detaching said detachable means.

2. In an independent wheel suspension device for an automotive vehicle, said suspension device comprising a hydraulic tubular shock absorber having a pair of relatively movable telescopic parts, detachable means on one of said telescopic parts connectable to a body portion of sadi vehicle, a tube removably supporting the other of said telescopic parts, said tube being connectable to a wheel spindle and having a threaded member forming a closure for one end thereof connectable to and supportable by a suspension arm, whereby said shock absorber is removable and replaceable through said one end upon detaching said detachable means and removing said threaded member.

3. In an independent wheel suspension device for an automotive vehicle, said suspension device comprising a hydraulic tubular shock absorber having a pair of relatively movable telescopic parts, detachable means on one of said telescopic parts connectable to a body portion of said vehicle, a tube removably supporting the other of said telescopic parts, a compression spring sleeved over said tube, said spring caged between a first support fixed to said tube and a second support supportable by said body portion, said tube being connectable to a wheel spindle and having a threaded member in one end thereof, universally supportable on a suspension arm, whereby said shock absorber is removable and replaceable upon detaching said detachable means and removing said threaded member.

4. In an independent wheel suspension device for an automotive vehicle, said suspension device comprising a hydraulic tubular shock absorber having a pair of relatively movable telescopic parts, detachable means on one of said telescopic parts connectable to a body portion of said vehicle, a tube connectable to a wheel spindle and removably receiving the other of said telescopic parts, said tube having a ball member threaded into its lower end, said ball member supporting the other of said telescopic parts and receivable in a socket connectable to a suspension arm whereby said shock absorber is removable and replaceable upon detaching said detachable means and removing said ball member from said tube lower end.

5. In an independent wheel suspension device for an automotive vehicle, said suspension device comprising a hydraulic tubular shock absorber having a piston rod and piston slidably disposed in a cylinder assembly, detachable means on said piston rod connectable to a body portion of said vehicle, said detachable means including a bearing supportable in said body portion and receiving a reduced end of said piston rod and a nut threaded on said reduced end, a tube connectable to a wheel spindle and removably receiving said cylinder assembly, said tube having a ball member threaded into its lower end, said ball member supporting said cylinder assembly and receivable in a socket connectable to a suspension arm whereby said shock absorber is removable and replaceable upon detaching said nut and removing said ball member from said tube lower end.

6. In an independent wheel suspension device for an automotive vehicle, said suspension device comprising a hydraulic tubular shock absorber having a piston rod and piston slidably disposed in a cylinder assembly, detachable means on said piston rod connectable to a body portion of said vehicle, said detachable means including a bearing resiliently supportable in said body portion and receiving a reduced end of said piston rod and a nut thread on said reduced end, a tube connectable to a wheel spindle and removably receiving said cylinder assembly, a compression spring sleeved over said tube, said spring caged between a first support fixed to said tube and a second support held between said bearing and a shoulder on said piston rod adjacent said reduced end, said tube having a ball member threaded into its lower end, said ball member supporting said cylinder assembly and receivable in a socket connectable to a suspension whereby said shock absorber is removable and replaceable upon detaching said nut and removing said ball member from said tube lower end.

7. In an independent wheel suspension device for an automotive vehicle, said suspension device comprising a hydraulic tubular shock absorber having a pair of relatively movable telescopic parts, detachable means on one of said telescopic parts connectable to a body portion of said vehicle, a tube mounted in and fixed to a sleeve connectable to a wheel spindle and removably receiving the other of said telescopic parts, said tube having a ball member threaded into its lower end, said ball member supporting the other of said telescopic parts and receivable in a socket connectable to a suspension arm whereby said shock absorber is removable and replaceable upon detaching said detachable means and removing said ball member from said tube lower end.

References Cited

UNITED STATES PATENTS

| 2,567,144 | 9/1951 | Butterfield | 280—96.2 |
| 2,624,592 | 1/1953 | MacPherson | 280—96.2 |
| 2,935,334 | 5/1960 | Felts | 280—96.2 |
| 2,992,013 | 7/1961 | Zeigler et al. | 280—96.2 |
| 3,156,481 | 11/1964 | Dangauthier | 280—96.2 X |

FOREIGN PATENTS

| 595,193 | 7/1959 | Italy. |
| 1,031,650 | 6/1966 | Great Britain. |

KENNETH H. BETTS, *Primary Examiner.*